United States Patent
Christensson et al.

(10) Patent No.: US 10,252,927 B2
(45) Date of Patent: Apr. 9, 2019

(54) ANAMMOX PROCESS AT WASTE WATER PLANT

(71) Applicant: Veolia Water Solutions & Technologies Support, Saint-Maurice (FR)

(72) Inventors: Magnus Christensson, Lomma (SE); Thomas Welander, Furulund (SE); Maria Piculell, Malmö (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 15/513,076

(22) PCT Filed: Sep. 24, 2015

(86) PCT No.: PCT/EP2015/072008
§ 371 (c)(1),
(2) Date: Mar. 21, 2017

(87) PCT Pub. No.: WO2016/046330
PCT Pub. Date: Mar. 31, 2016

(65) Prior Publication Data
US 2017/0291839 A1    Oct. 12, 2017

(30) Foreign Application Priority Data
Sep. 24, 2014    (SE) ...................................... 1451128

(51) Int. Cl.
*C02F 3/30*    (2006.01)
*C02F 3/12*    (2006.01)
(Continued)

(52) U.S. Cl.
CPC ................ *C02F 3/307* (2013.01); *C02F 3/08* (2013.01); *C02F 3/121* (2013.01); *C02F 11/04* (2013.01);
(Continued)

(58) Field of Classification Search
CPC .. C02F 3/307; C02F 3/121; C02F 3/08; C02F 11/04; C02F 2301/10; C02F 2101/16
(Continued)

(56) References Cited

U.S. PATENT DOCUMENTS

| 7,314,741 B2 * | 1/2008 | Tal | A01K 63/04 |
| | | | 210/167.21 |
| 2006/0191846 A1 * | 8/2006 | Sumino | C02F 3/2806 |
| | | | 210/603 |

(Continued)

FOREIGN PATENT DOCUMENTS

| WO | 2013/084972 A1 | 6/2013 |
| WO | 2013/151836 A1 | 10/2013 |

OTHER PUBLICATIONS

Machine-generated English translation of WO 2013/084972, dated Apr. 23, 2018.*

(Continued)

*Primary Examiner* — Fred Prince
(74) *Attorney, Agent, or Firm* — Honigman LLP; Anna M. Budde

(57) ABSTRACT

A process for converting ammonium ($NH_4^+$) of a mainstream of a wastewater plant to dinitrogen gas ($N_2$), including the consecutive steps of i.) removing biodegradable carbon compounds in the mainstream, ii.) converting ammonium ($NH_4^+$) in the mainstream to nitrite ($NO_2^-$) in an aerated biological process containing ammonium oxidizing bacteria (AOB) in a nitration vessel (133a-133d); and iii.) denitrifying the resulting stream from step ii.) to dinitrogen gas in an anammox vessel (200). Growth of nitrite oxidizing bacteria (NOB) in step ii.) is prevented by periodically subjecting the bacteria in said nitration vessel (133a-133d) to water suppressing growth of nitrite oxidizing bacteria (NOB).

13 Claims, 2 Drawing Sheets

(51) Int. Cl.
*C02F 11/04* (2006.01)
*C02F 3/08* (2006.01)
*C02F 3/10* (2006.01)
*C02F 101/16* (2006.01)

(52) U.S. Cl.
CPC ............ *C02F 3/10* (2013.01); *C02F 2101/16* (2013.01); *C02F 2209/14* (2013.01); *C02F 2301/08* (2013.01); *C02F 2301/10* (2013.01); *Y02E 50/343* (2013.01); *Y02W 10/15* (2015.05)

(58) Field of Classification Search
USPC ........ 210/605, 612, 615, 616, 617, 903, 631
See application file for complete search history.

(56) References Cited

U.S. PATENT DOCUMENTS

| | | | |
|---|---|---|---|
| 2010/0243562 A1* | 9/2010 | Kimura | C02F 3/10 210/605 |
| 2010/0243565 A1* | 9/2010 | Isaka | C02F 3/108 210/614 |
| 2010/0314311 A1* | 12/2010 | Peng | C02F 3/1263 210/605 |
| 2011/0084022 A1* | 4/2011 | Lee | C02F 3/301 210/605 |
| 2011/0253625 A1* | 10/2011 | Takeda | C02F 3/006 210/615 |
| 2013/0327709 A1* | 12/2013 | Stroot | C02F 3/006 210/605 |

OTHER PUBLICATIONS

PCT International Search Report No. PCT/EP2015/072008, dated Dec. 4, 2015, issued by the European Patent Office acting as the International Searching Authority (20 pages).

Christian Fux et al., "Biological Treatment of Ammonium-Rich Wastewater by Partial Nitration and Subsequent Anaerobic Ammonium Oxidation (Anammox) in a Pilot Plant," Journal of Biotechnology, Nov. 13, 2002, pp. 295-306, vol. 99, No. 3.

Pusker Regmi et al., "NOB Repression for Mainstream Nitrite-Shunt and Deammonification: A Pilot Study," Proceedings of the Water Environment Federation, WEFTEC 2013, Session 26-Session 34, pp. 1959-1981.

* cited by examiner

ANAMMOX PROCESS AT WASTE WATER PLANT

CROSS REFERENCE TO RELATED APPLICATIONS

This application is a 35 USC § 371 United States National stage application of International Application No. PCT/EP2015/072008, filed Sep. 24, 2015, which claims priority to Swedish Application No. SE 1451128-1, filed Sep. 24, 2014.

FIELD OF THE INVENTION

The present invention refers to a process for converting ammonium of a mainstream of a wastewater plant to dinitrogen gas. The process includes removing biodegradable carbon compounds in the mainstream, after which ammonium in the mainstream is converted to nitrite in an aerated biological process containing ammonium oxidizing bacteria (AOB) in a nitration vessel. Nitrite in the resulting stream is then converted to dinitrogen gas in an anammox vessel.

PRIOR ART

In the art of wastewater treatment, it is vital to reduce the content of nitrogen compounds, mainly ammonium, from the wastewater stream. Today, this is usually achieved by the aerobic biological oxidation of nitrogen from ammonium ($NH_4^+$) to nitrate ($NO_3^-$)(nitrification), followed by denitrification, the reduction of nitrate to nitrogen gas. Nitrogen gas is released to the atmosphere and thus removed from the water. The denitrification process takes place under anoxic conditions and require an electron donor, usually in the form of biodegradable organic material to reduce the nitrate.

Nitrification itself is a two-step aerobic process, each step facilitated by a different type of bacteria. The oxidation of ammonium ($NH_4^+$) to nitrite ($NO_2^-$) is facilitated by so-called ammonium oxidizing bacteria (AOB), for example *Nitrosomonas* spp. ("nitroso" referring to the formation of a nitroso functional group). Nitrite oxidation to nitrate ($NO_3^-$), is carried out by so-called nitrite oxidizing bacteria (NOB), such as *Nitrospira* spp (nitro referring the formation of a nitro functional group).

Denitrification requires anoxic conditions It is facilitated by a wide diversity of bacteria. Since denitrification is the reduction of nitrate to dinitrogen gas, an electron donor is needed. This can be, depending on the wastewater, biodegradable organic matter (e.g. from faeces), sulfide, or an added donor like methanol.

In wastewater treatment, nitrification as well as denitrification is usually carried out in the activated sludge process but also in different kinds of biofilm processes. Nitrification, being an aerobic process, is normally operated with the supply of air which provides both oxygen for the oxidation and mixing of the reactor contents. The denitrification tanks, operated without air, are typically mixed mechanically, e.g. by using submersible mixers, in order to secure good contact between wastewater and the active biomass so that the desired denitrification is achieved.

The traditional way of removing nitrogen through nitrification and denitrification is energy and resource consuming. The oxidation of ammonium to nitrate requires a large input of energy for aeration to supply oxygen. Large amounts of organic matter are needed for denitrification, which may be added in the form of organic chemicals such as methanol. Alternatively, the denitrification process may be carried out using so-called pre-denitrification, in which the organic content of the wastewater itself is used to reduce nitrate. However, even in this case, it is highly desirable to reduce or eliminate the amount of organic matter needed for nitrogen removal, as it is regarded a resource from which energy can be recovered in the form of biogas by applying anaerobic treatment.

One possibility to reduce the consumption of energy and organic matter for nitrogen removal is to apply the so-called SHARON process. This process makes use of partial nitrification, i.e. nitritation, that is the oxidation of ammonium to nitrite, i.e. $NO_2^-$, followed by denitritation, i.e. the reduction of nitrite to dinitrogen gas, $N_2$, with the consumption of organic matter. As compared with traditional nitrification/denitrification, the SHARON process reduces both the amounts of oxygen and organic matter needed. However, the application of the SHARON process has been limited to wastewater streams with high concentrations of ammonium and high temperature (>20° C.) as it has not been possible to maintain a stable nitritation at lower ammonium concentrations and temperatures. Under conditions typical for mainstream municipal wastewater, i.e. low ammonium concentration and at least seasonally low temperatures, the second step of nitrification, i.e. the oxidation of nitrite to nitrate, has proven faster than the first step, i.e. the oxidation of ammonium to nitrite, so that a stable nitritation without forming nitrate has not been possible. Therefore the SHARON process is applied only for streams such as reject water from sludge dewatering that are high in ammonium concentration and temperature.

A more recent development for nitrogen removal is the so-called anammox process. In this process, a wastewater stream is subjected to an oxidation of part of the ammonium content to nitrite. In a subsequent anoxic process performed by so-called anammox bacteria, the nitrite formed and the ammonium remaining react to form water ($H_2O$) and dinitrogen gas ($N_2$), a reaction called anoxic deammonification. The anammox process has great advantages as it reduces the oxygen needed by 60% and eliminates completely the need for organic matter as compared with traditional nitrification/denitrification. The anammox process can be carried out either with a type of activated sludge process based on so-called granular sludge, i.e. dense aggregates of bacteria, or with different kinds of biofilm processes, the biomass growing on a carrier media most often made of plastic. The anammox process can be run with separate tanks for aerobic nitritation and anoxic deammonification. Part of the ammonium content of the waste stream is then oxidized to nitrite in the nitritation reactor after which this nitrite and ammonium are reacting to nitrogen gas in the deammonification reactor. It is theoretically possible to control the treatment in the first stage so that half of the ammonium is oxidised and thereafter transfer the water to the second stage in order to allow the $NO_2^- + NH_4^+ \Rightarrow H_2O + N_2$ reaction of the remaining ammonium and the formed $NO_2^-$. It is, however, preferred to divide the stream of water to be treated into two streams, wherein one of the streams is subjected to the ammonium oxidation to $NO_2^-$ and the other stream is bypassed. The two streams are then mixed in an anoxic tank, where the $NO_2^- + NH_4^+ \Rightarrow H_2O + N_2$ reaction of the ammonium in the bypassed stream and the $NO_2^-$ in the treated stream takes place. Alternatively, using a biofilm type of process, the anammox process can be performed in a single stage, wherein the oxidation of ammonium to nitrite takes place in an upper layer of a biofilm and the anoxic process forming water and nitrogen gas takes place in a deeper layer of the biofilm.

Although very advantageous from an energy and resource point of view, the anammox process has, however, some severe limitations. Just as for the SHARON process, the anammox process depends upon a stable nitritation without the nitrite formed being further oxidized to nitrate by NOB. In practice, this has only been possible on wastewater with high ammonium concentrations and high temperatures (>20° C.). Consequently, the anammox process has been successfully applied on streams such as reject water from dewatering of digested sludge, while previous attempts to run the anammox process with ordinary "main stream" municipal wastewater have proven unsuccessful.

WO 2013/151836 discloses an anammox process, wherein main stream waste water is treated in a single step. The biofilm performing both the $NH_4^+ + O_2 => NO_2 + H_2O$ reaction and the $NO_2^- + NH_4^+ => H_2O + N_2$ is grown on carrier elements allowing for a virtually unlimited biofilm thickness. In order to "rejuvenate" the biofilm, the carrier elements on which the biofilm grows is periodically subjected to waste water having a high concentration of $NH_4^+$. Due to the rejuvenating process, the process will function relatively well even for wastewater containing low concentrations of $NH_4^+$.

However, it has been shown that the anammox bacteria, performing the $NO_2^- + NH_4^+ => H_2O + N_2$ reaction are very sensitive to high concentrations of $NH_4^+$ and $NO_2^-$ during the periodical subjection to wastewater with high concentrations of ammonium and to avoiding to kill these bacteria, the process has to be operated under conditions that will not completely suppress the NOB converting $NO_2^-$ to $NO_3^-$. Moreover, this problem has been found to increase further by the required thick biofilm developing zones with conditions favourable for the oxidation of $NO_2^-$ to $NO_3^-$ when operating on main stream wastewater.

In Pusker Regmi et. al., "NOB Repression for Mainstream Nitrite-Shunt and Deammonijication: A Pilot Study". Proceedings of the Water Environment Federation, WEFTEC 2013: Session 26 through Session 34, pp. 1959-1981(23), a pilot study for the viability of mainstream NOB suppression and deammonification is described. The publication considers Nitritation-Denitritation through Modulating Aeration (NiDeMA) CSTR with a clarifier followed by a fully-anoxic AMX moving bed bioreactor (MBBR). The NiDeMA CSTR is operated under cyclical dissolved oxygen (DO) conditions for NOB suppression.

However, in the pilot study, the aeration scheme is controlled via an extensive sensor and monitoring system with aeration cycles as short and precise as 10 minutes. Furthermore, transient anoxia has been validated primarily for high strength wastes, and true use for mainstream NOB suppression has still got to be shown.

SUMMARY OF THE INVENTION

The above and other problems are solved or at least mitigated by a process for converting ammonium ($NH_4^+$) of a mainstream of a wastewater plant to dinitrogen gas ($N_2$), including the consecutive steps of:
  i.) removal of biodegradable carbon compounds in the mainstream;
  ii.) conversion of ammonium ($NH_4^+$) in the mainstream to nitrite ($NO_2^-$) in an aerated biological process containing ammonium oxidising bacteria (AOB) in a nitration vessel;
  iii.) denitrifying the resulting stream from step ii.) in an anammox vessel;

wherein growth of nitrite oxidising bacteria (NOB) in step ii.) is prevented by periodically subjecting the bacteria in said nitration vessel to water suppressing growth of nitrite oxidising bacteria (NOB).

Typically, the resulting stream from step ii.) is denitrified by converting nitrite together with ammonium to dinitrogen gas.

In order to provide for an environment free of biodegradable carbon compounds, step i.) may comprise aerated biological treatment of the mainstream of the wastewater, such that the biodegradable carbon compounds react with oxygen ($O_2$) to form carbon dioxide ($CO_2$) and water ($H_2O$).

In order to use the energy comprised in the biodegradable carbon compounds, step i.) may comprise an anaerobic digestion of the wastewater, such that methane (CH4), is formed by the biodegradable organic compounds.

Step i.) may comprise an aerated biological treatment of the mainstream of the wastewater, such that the biodegradable carbon compounds will react with oxygen ($O_2$) to form carbon dioxide ($CO_2$) and water ($H_2O$).

In order to make the energy conservation more efficient, step i.) may comprise micro filtering of the biodegradable organic compounds, wherein the filtrate is conveyed to a digester for subsequent digestion.

Since most waste water treatment plants are provided with a sludge digester providing a reject water from dewatering of the digested sludge having high concentration of ammonium, it may be beneficial if the water suppressing growth of nitrite ($NO_2^-$) oxidising bacteria is reject water. The ammonium concentration of the reject water is higher than that of the mainstream of a wastewater plant and may lie in the range from 300 mg(N)/l to 1200 mg(N)/l.

In another embodiment of the invention, the water suppressing growth of nitrite ($NO_2^-$) oxidising bacteria (NOB) may contain high concentrations of $NO_2$, higher than that of the mainstream of a wastewater plant. In such a case, the concentration of $NO_2^-$ may be in the range from 300 mg(N)/l to 1200 mg(N)/l.

Since tests have shown that the best suppression of nitrite oxidising bacteria takes place at elevated temperatures, the temperature of the water suppressing growth of nitrite ($NO_2^-$) oxidising bacteria (NOB) may be 20-35 degrees centigrade.

Tests have shown that a suitable time between subjecting the bacteria to water suppressing growth of nitrite oxidizing bacteria (NOB) is between 0.5 to 10 weeks.

The denitritation step may be performed by adding an organic electron donor to the water after step ii.) and allowing bacteria to convert the nitrite to dinitrogen gas.

Alternatively, the denitritation process may be performed by transferring the mainstream in which $NH_4^+$ has been converted to $NO_2^-$ is to an anammox vessel where said stream is denitrified by adding water containing ammonium ($NH_4^+$) to the water after step ii.) and allowing bacteria to convert the nitrite ($NO_2^-$) using ammonium as the electron donor. This alternative is beneficial since no organic electron donor, i.e. in form of biodegradable carbon compounds, is necessary for the denitritation.

In one alternative, the mainstream in which $NH_4^+$ has been converted to $NO_2^-$ is transferred to an anammox vessel in which nitrite ($NO_2^-$) formed in the nitritation vessel is allowed to react with residual ammonium ($NH_4^+$) in the wastewater to form dinitrogen gas ($N_2$).

The anammox vessel (200) is preferably operated under non-aerated or anoxic conditions. Anoxic conditions refers to water that has a concentration of dissolved oxygen of 0.5 milligrams per liter or less.

In order to provide for easy suppressing of growth of nitrite ($NO_2^-$) oxidising bacteria (NOB), the bacteria may grow on free-flowing carrier elements. In order to get a biofilm having a well-defined thickness, the free-flowing carrier elements may be designed such that a thickness of a film in which the bacteria grow is controlled to a limited thickness, e.g. 500 μm, 300 μm or 200 μm.

BRIEF DESCRIPTION OF THE DRAWINGS

Hereinafter, the invention will be described by description of preferred embodiments with reference to the appended drawings, wherein.

DESCRIPTION OF EMBODIMENTS

The present invention is primarily directed to purification of municipal wastewater. Such wastewater contains a variety of contaminants, e.g. nitrogen compounds (mainly in the form of ammonium salts), phosphorous compounds and different kinds of carbon compounds.

Figure 1:
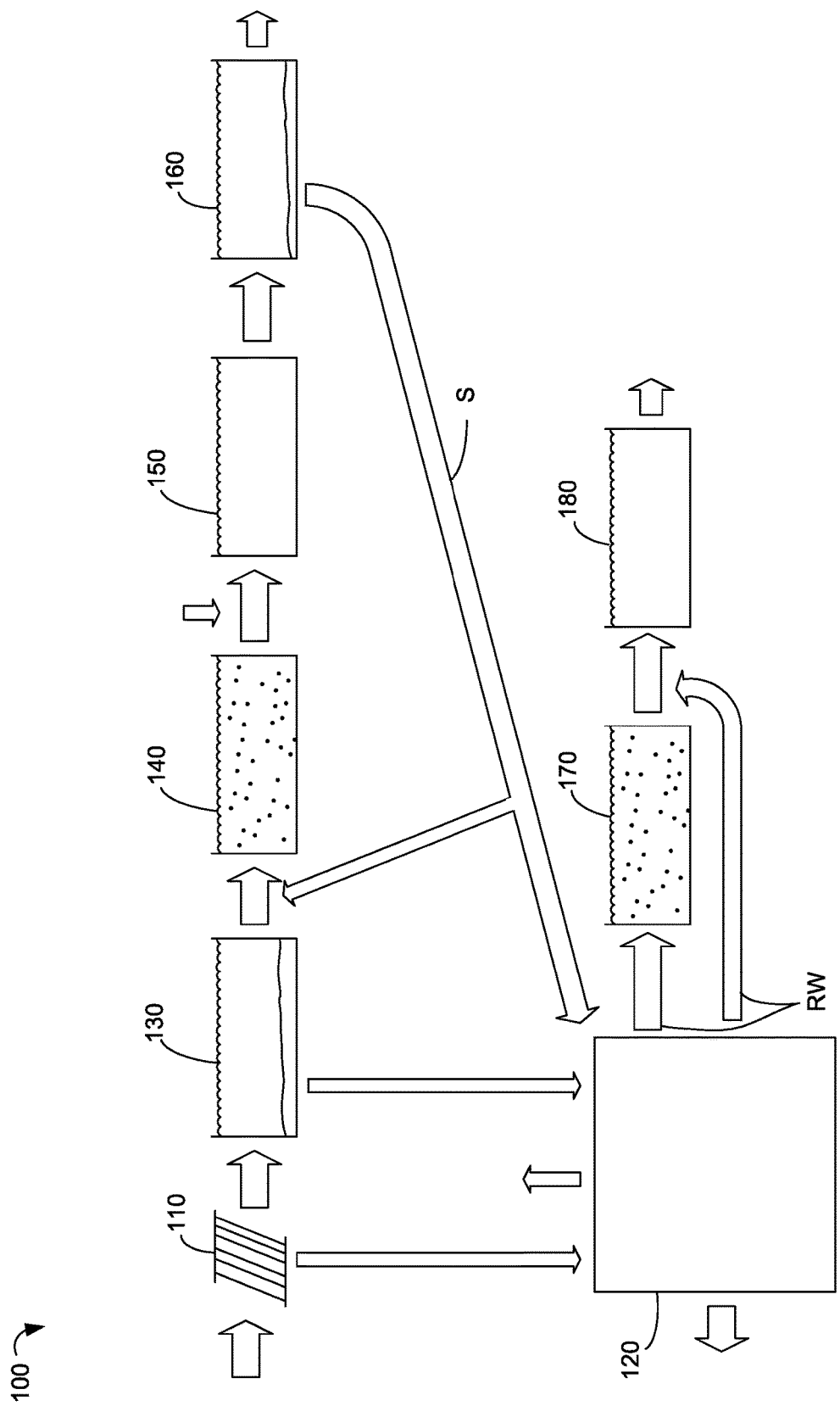
FIG. 1 is a scheme showing a prior art wastewater plant.

In FIG. 1, a schematic view of an exemplary prior art wastewater treatment plant 100 is shown. It should be understood that a prior art plant not necessarily will comprise all the shown components and process steps. It could also comprise more steps and processes than the ones shown.

In a first step 110, the wastewater will be sieved, in order to remove large particles and other debris. The size of the sieve openings may vary significantly. If small sieve openings are used, a substantial portion of the compounds containing carbon will be trapped in the sieve. The particles trapped in the sieve may be transported to a digester 120, in which the particles will digest anaerobically to form e.g. methane. However, in many cases, a very crude sieve (not shown) may be provided upstream the sieve 110. The items stuck in the crude sieve are often not digestible, and may hence be deponated.

In a second step, even more particles will be separated from the waste water by a sedimentation step 130, in which particles denser than water will sink to a bottom of a tank, whereas particles less dense than water will float to the surface. The denser particles will form a sludge layer on the bottom and can be pumped out from the sedimentation step, whereas the less dense particles may be skimmed from the surface. The sludge and skimmed particles from the sedimentation step will also be conveyed to the digester 120.

In a third step, an "activated sludge" process will reduce the contents of carbon compounds and ammonium.

Generally, the active sludge process start with an aerobic step 140, in which bacteria contained in a sludge or provided on carrier elements (not shown) will consume organic compounds and oxidise ammonium to nitrate, $NO_3^-$. The aerobic step is dependent on air being pumped through the vessel containing the sludge and the wastewater, since oxygen is required for oxidising the organic compounds and the ammonium to nitrate. The first step of the activated sludge process is generally referred to as the nitrification step.

The second step of the activated sludge process is a denitrification step 150, in which the nitrate formed by the nitrification step will be reduced to nitrogen gas, i.e. $N_2$. This step takes place under anoxic conditions, i.e. without oxygen, and also requires an electron donor, for example in form of biodegradable organic matter CH in order to reduce the nitrate to $N_2$. The organic matter, or electron donor, is usually added to the wastewater in form of ethanol, methanol, acetone, or any other easily biodegradable carbon source.

After the denitrification step 150, there is a final sedimentation step 160 for removing sludge S from the wastewater. The majority of the removed sludge S is reintroduced into the activated sludge process, usually in the nitrification step 140, but since new sludge is formed during the activated sludge process, some of the sludge removed after the activated sludge process is conveyed to the digester 120, where it is allowed to digest.

In some cases, the treated wastewater is filtered through a mechanical filter, e.g. a sand filter, prior to being let out in the environment.

As mentioned earlier, the sludge S removed from the wastewater in the sedimentation step 160 is conveyed to the digester 120 for further treatment. In the digester, methane gas, $CH_4$, is formed under anaerobic conditions. The methane forming process will continue until all of the easily biodegradable organic material in the sludge is consumed. After this organic matter is consumed, there will still be some sludge left. This sludge is drained from excess water, which has high concentrations of ammonium. This water, which generally is referred to as reject water RW, can either be conveyed back to the main stream, i.e. the aerobic step 140, or be treated separately in order to reduce the nitrogen compounds therein.

Recently, the so-called anammox process has been used for reducing the content of nitrogen compounds in the reject water RW. The anammox process differs significantly from the previously disclosed process for reducing the ammonium content of the main stream.

In the anammox process, which is schematically shown in FIG. 1, a part of the reject water is subjected to an oxidation process 170, in which the ammonium, $NH_4^+$, in the reject water is oxidised to form $NO_2^-$, i.e. nitrite. The other part of the reject water bypasses the oxidation process 170. For some reason, the high ammonium content of the reject water seems to suppress bacteria forming nitrate, i.e. $NO_3^-$, and promote bacteria forming nitrite, i.e. $NO_2^-$. It also seems that high temperatures promote nitrite forming bacteria.

After the part of the reject water has been subjected to the oxidising process forming nitrite, $NO_2^-$, i.e. the nitritation process, the part having been subjected to the oxidising process is mixed with the bypassed part, such that bacteria may use the nitrate to reduce the ammonium in the untreated water, hence forming nitrogen gas. This process is performed under anoxic, i.e. oxygen-free, conditions at 180.

As can be noted above, one major difference, and benefit, with the anammox process is that no biodegradable organic compound is necessary for the reduction of ammonium to nitrogen gas. Moreover, the nitritation process consumes less oxygen than the nitrification process disclosed in connection with FIG. 1.

As mentioned above, the oxidation process for forming $NO_2^-$ rather than $NO_3^-$ only works with high $NH_4^+$ concentrations; if the $NH_4^+$ concentrations are too low, growth of bacteria forming $NO_3^-$ from $NO_2^-$ will be promoted, and the $NO_2^- \Rightarrow NO_3^-$ process is much faster than the $NH_4^+ \Rightarrow NO_2^-$ process, meaning that once bacteria performing the $NO_2^- \Rightarrow NO_3^-$ reaction has been formed, virtually all $NH_4^+$ will end up as $NO_3^-$, which makes a subsequent anammox process impossible.

According to one embodiment of the invention, growth of bacteria forming $NO_3^-$ from $NO_2^-$ is inhibited by sequentially subjecting biofilm grown on biofilm carriers to a water having high concentration of $NH_4^+$. This embodiment is useful both for the anammox process and the Sharon process as disclosed in the prior art section, and gives the possibility to oxidise ammonium contained in water having a low concentration thereof to nitrite rather than nitrate. As mentioned in the prior art section, for the Sharon process, this is beneficial since less oxygen is required for the nitritation process compared to the nitrification process and since less organic electron donor, e.g. in form of biodegradable carbon sources, is required for the denitritation process. For the anammox process, formation of $NO_2^-$ rather than $NO_3^-$ is a necessity for the conversion $NH_4^+ + NO_2^- => N2 + H2O$.

Figure 2:
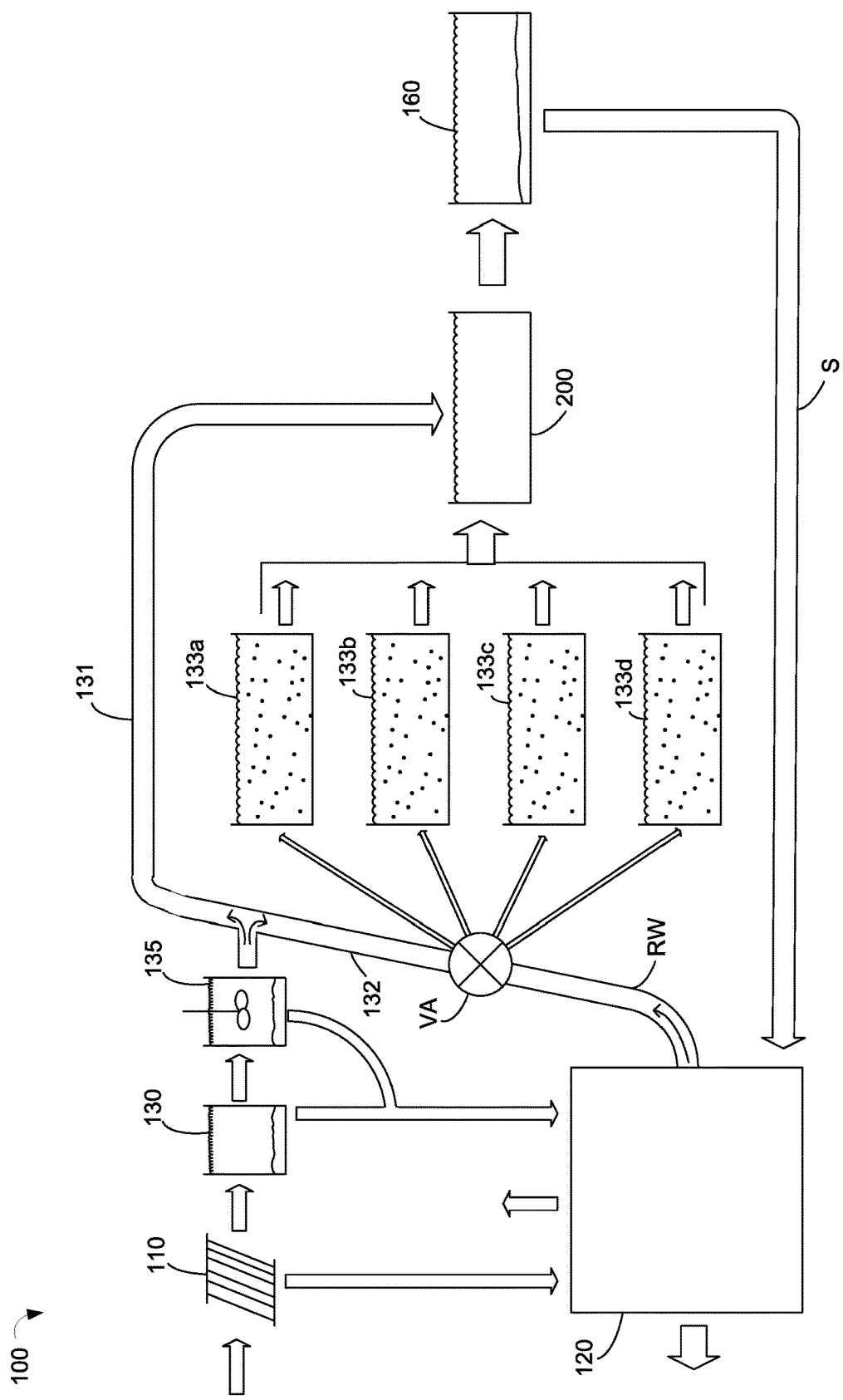
FIG. 2 is a scheme of a one embodiment of a wastewater plant using the system according to the present invention.

In FIG. 2, a schematic view of a wastewater treatment plant according to one embodiment of the invention is shown. Most components and process steps are identical to the components and process steps of the previously described prior art systems, and for identical or similar processes and steps, the same reference numerals have been used in both FIGS. 1 and 2. It should be noted that that the reduction of $NH_4^+$ differs completely between the embodiments shown in FIGS. 1 and 2.

In FIG. 2, a first embodiment of the present invention is shown. The wastewater first enters the previously disclosed sieve 110 and sediment arrangements 130 for collection of particulate matter, which sieves and sediment arrangements do not form part of the invention, and hence will not be disclosed further, and continues to a biological process, which will be described below. The sludge from the sieves and sedimentary steps is conveyed to the digester 120, where it is digested; so far, the process is identical to the prior art process shown in FIG. 1.

After the sedimentation step 130, the wastewater is treated to oxidise biodegradable carbon compounds at the process step 135. By keeping the load on this step high, i.e. maintain a high flux of biodegradable carbon compounds into the process step, growth of bacteria oxidising ammonium to either $NO_2^-$ or $NO_3^-$, i.e. AOB and NOB, can be kept low, and large amounts of excess biological sludge can be formed, which increases the production of biogas in the digester.

After the step 135, the wastewater stream is divided into first 131 and second 132 streams. The second stream 132 is conveyed to several parallel nitritation processes (i.e. nitrite converting processes) in which the bacteria are adapted (in a way to be described later) to oxidise $NH_4$ to $NO_2^-$, i.e. nitrite, while the first stream bypasses these vessels. In this process, which takes place under aerobic conditions, any remaining biodegradable carbon compounds in the wastewater are oxidised to $CO_2$. It is, however, crucial that the concentration of biodegradable carbon compounds is low; otherwise, the bacteria in the nitritation vessels will be dominated by bacteria converting biodegradable carbon compounds to $CO_2$ rather than bacteria converting $NH_4^+$ to $NO_2^-$. Please note that there are several different parallel nitritation vessels 133a-133d for performing the nitritation process.

According to the invention, not all of the nitritation vessels are connected to the second stream 132; one of the nitritation vessels is instead connected to the reject water outlet, RW, which, as mentioned, contains high concentrations of $NH_4^+$. Due to the high concentration of $NH_4^+$ in the reject water, and/or the high concentrations of $NO_2^-$ formed in the vessel, the bacteria in the vessel connected to the reject water outlet will grow such that conversion (i.e. oxidation) of $NH_4^+$ to $NO_2^-$ is promoted, rather than bacteria converting $NO_2^-$ to $NO_3^-$, i.e. NOB.

Surprisingly, it has been found that the $NH_4^+$ to $NO_2^-$ converting bacteria, AOB, that have been promoted due to the connection of the nitritation vessel to the reject water outlet will continue to convert $NH_4^+$ to $NO_2^-$ rather than $NO_3$ even if the nitrification vessel thereafter is connected to "normal" wastewater, i.e. wastewater containing $NH_4^+$ in significantly lower concentrations. Hence, by sequencing the connection of the nitrification vessels between the reject water outlet and the main stream wastewater, conversion of $NH_4^+$ to $NO_2^-$ can be maintained for "normal", i.e. low, concentrations of $NH_4^+$ during the periods between the vessel being connected to the reject water outlet.

In the shown embodiment, the sequencing between running the vessel with reject water and wastewater is achieved by controlling a valve assembly VA in a way well known by persons skilled in the art, such that wastewater during some periods are conveyed to some vessels and reject water to some of the vessels. After a certain time, for example when it can be shown that the vessel fed with high $NH_4$ concentration reject water outputs mostly $NO_2^-$ rather than $NO_3^-$, another vessel will be fed reject water RW. Thus, the bacteria can be periodically subjected to water suppressing growth of nitrite oxidizing bacteria (NOB), such as through consecutive feeding of reject water RW to the parallel nitritation vessels 133a-133d in regular or irregular cycles, or though intermittent feeding of reject water RW to the different nitritation vessels 133a-133d.

It should be noted that the nitrification vessels preferably are, at least to a certain degree, filled with carrier elements provided with protected surfaces for growth of a bacterial film thereon. In one preferred embodiment of the invention, the carrier elements are designed such that a thickness of the bacterial film will not exceed a certain value, e.g. 500, 300 or 200 µm. This is beneficial since the bacterial film will have the same properties in its entire thickness and conditions that may favour the oxidation of $NO_2^-$ to $NO_3^-$ deep in a thick biofilm can be avoided.

In another embodiment of the invention, the wastewater and the reject water are always connected to the same vessels, and the carrier elements are moved from vessel to vessel once the bacteria on the carrier elements of a vessel connected to wastewater need a time at high $NH_4^+$ or $NO_2^-$ concentrations in order to regain the ability to convert $NH_4^+$ to $NO_2^-$ rather than $NO_3^-$, i.e. such that nitrite rather than nitrate is formed for the water having low concentration of ammonium.

After the nitritation process in the vessels 133a-133d, the water of the second stream and the reject water RW that has been treated in the nitritation vessel in which the bacteria required treatment in order to regain the $NH_4^+ => NO_2^-$ conversion efficiency will be transferred to an anammox vessel 200, where it will be mixed with water from the first stream 131, which contains ammonium, that may react biologically with the $NO_2^-$ from the nitritation processes to form $N_2$.

The anammox vessel (200) is preferably operated under non-aerated or anoxic conditions, where anoxic conditions refers to water that has a very low concentration of dissolved oxygen (such as less than 0.5 milligrams per liter). In the anoxic process performed by so-called anammox bacteria, the nitrite ($NO_2^-$) and the ammonium ($NH_4^+$) will react to form water ($H_2O$) and dinitrogen gas ($N_2$), in an anoxic deammonification reaction.

According to the invention, the bacteria in the nitritation vessels 133a-133d are intermittently treated to promote bacteria forming $NO_2^-$ from $NH_4^+$ rather than $NO_3^-$ from $NH_4^+$. This could be done in several ways:

1. Increase the amount (i.e. concentration) of $NH_4^+$ to which the bacteria are subjected;

2. Increase the amount of $NO_2^-$ to which the bacteria are subjected;

3. Increase the temperature (in a "normal" main stream of a water purification plant, the temperature is often 12-15 degrees centigrade, whereas the optimum temperature for promoting bacteria for $NO_2^-$ formation is in the order of 30 degrees centigrade).

It should be noted that the above ways may be freely combined. It should also be noted that item 1 above leads to item 2, since the ammonium, $NH_4^+$; will be converted to $NO_2^-$; in one embodiment of the invention, the stream of water to and from the vessel containing the bacteria to be adapted to promote $NO_2^-$ production is simply shut off, after which a sufficient dose of highly concentrated ammonium or nitrite is added to the water in the vessel. Then, the water is left in the vessel until all, or the majority, of the ammonium, $NH_4^+$, as been oxidised to $NO_2^-$. If desired, the water may even stay in the vessel for a significant time after all of the ammonium has been oxidised to $NO_2^-$.

In one specific embodiment, the mainstream wastewater is treated in the nitritation vessel 133a-133d in such a way that only part of the ammonium, $NH_4^+$ is converted to $NO_2^-$, leaving residual ammonium in the wastewater. This can be achieved in several ways, for instance by managing the addition of ammonium to the nitritation vessel 133a-133d during the nitritation process, or by leading the mainstream wastewater from the nitritation vessel 133a-133d to an anammox vessel 200 before the nitrification process has oxidized all ammonium, $NH_4^+$ to $NO_2^-$. The mainstream wastewater is treated in the nitritation vessel 133a-133d under aerobic conditions wherein part of the ammonium in the wastewater is oxidized to nitrite. After the nitritation vessel 133a-133d, the mainstream wastewater is led to an anammox vessel 200 operated under anoxic conditions in which nitrite formed in the nitritation vessel is allowed to react with residual ammonium in the wastewater to dinitrogen gas according to the anammox reaction. If the ratio of $NH_4^+$ to $NO_2^-$ is balanced (i.e. 1:1), the anommox reaction may proceed close to completion without additional addition of an electron donor. If the ratio of $NH_4^+$ to $NO_2^-$ is unbalanced (i.e. not 1:1), additional $NO_2^-$ may be added to the anammox vessel from the nitritation process in the vessels 133a-133d, or additional $NH_4^+$ may be added from the first stream 131, until the ratio is balanced (i.e. 1:1) allowing the anommox reaction to proceed close to completion. Such a strategy is suitable in the case where the flow or the ammonium content of the mainstream wastewater is highly variable.

In still another embodiment of the invention, the water in a nitritation vessel 133a-133d to be treated such that growth of bacteria converting $NO_2^- \Rightarrow NO_3^-$ is suppressed is pumped out, after which the water suppressing growth of such bacteria is filled into the vessel. After the bacteria in the vessel have been treated, the water suppressing growth of $NO_2^- \Rightarrow NO_3^-$ oxidising bacteria can be used to treat the bacteria of another vessel. This embodiment is beneficial in that it is economically possible to maintain the water suppressing growth of $NO_2^- \Rightarrow NO_3^-$ oxidising bacteria at an optimum temperature.

Dimensions

Typical $NH_4^+$ concentrations in the wastewater having the low concentration of $NH_4^+$ may be from 10-50 mg/l, measured in nitrogen equivalent, i.e. 10-50 mg(N)/l.

The $NH_4^+$ concentration of the reject water may be 300-1200 mg(N)/l

A typical hydraulic retention time in the nitritation vessels (133a-133f) may be 0.5-3 hours for the water having the low concentration of $NH_4^+$ The hydraulic retention time for the water suppressing growth of NOB, i.e. bacteria converting $NO_2^-$ to $NO_3^-$ may be 6-100 hours.

The time between subjecting the bacteria to water suppressing growth of NOB may be 0.5 to 10 weeks.

The invention claimed is:

1. Process for converting ammonium ($NH_4^+$) of a mainstream of a wastewater plant to dinitrogen gas ($N_2$), including the consecutive steps of:
   i.) removing biodegradable carbon compounds in the mainstream;
   ii.) converting ammonium ($NH_4^+$) in the mainstream to nitrite ($NO_2^-$) in an aerated biological process containing ammonium oxidizing bacteria (AOB) in a nitritation vessel; and
   iii.) denitrifying the resulting stream from step ii.) to dinitrogen gas ($N_2$) in an anammox vessel;
   characterized in that
   the anammox vessel is operated under non-aerated or anoxic conditions, and
   growth of nitrite ($NO_2^-$) oxidizing bacteria (NOB) in step ii.) is prevented by periodically subjecting the bacteria in said nitritation vessel to water suppressing growth of nitrite ($NO_2^-$) oxidizing bacteria (NOB),
   wherein the water suppressing growth of nitrite ($NO_2^-$) oxidizing bacteria (NOB) is water having a concentration of ammonium ($NH_4^+$) higher than that of the mainstream of a wastewater plant, wherein the concentration of ammonium ($NH_4^+$) lies in the range of 300 mg(N)/l to 1200 mg(N)/l
   and/or
   wherein water suppressing growth of nitrite ($NO_2^-$) oxidizing bacteria (NOB) contains concentrations of nitrite ($NO_2^-$) higher than that of the mainstream of a wastewater plant, wherein the concentration of nitrite ($NO_2^-$) lies in the range from 100 mg(N)/l to 1200 mg(N)/l.

2. The process of claim 1, wherein step i.) comprises aerated biological treatment of the mainstream, such that the biodegradable carbon compounds react with oxygen ($O_2$) to form carbon dioxide ($CO_2$) and water ($H_2O$).

3. The process of claim 1, wherein step i.) comprises an anaerobic treatment, such that methane ($CH_4$) is formed by the biodegradable organic compounds.

4. The process of claim 1, wherein step i.) comprises micro filtering of the biodegradable organic compounds.

5. The process of claim 1, wherein the temperature of the water suppressing growth of nitrite ($NO_2^-$) oxidizing bacteria (NOB) is 20 to 35 degrees centigrade.

6. The process of claim 1, wherein the time between subjecting the bacteria to water suppressing growth of nitrite ($NO_2^-$) oxidizing bacteria (NOB) is between 0.5 and 10 weeks.

7. The process according to claim 1, wherein the water suppressing growth of nitrite ($NO_2^-$) oxidizing bacteria (NOB) is reject water (RW) from a sludge digester.

8. The process according to claim 1, wherein the denitritation step is performed by adding an electron donor to the water after step ii.) and allowing bacteria to convert the nitrite ($NO_2^-$) to dinitrogen gas ($N_2$).

9. The process according to claim 8, wherein the mainstream in which ammonium ($NH_4^+$) has been converted to-nitrite ($NO_2^-$) is transferred to the anammox vessel and said stream is denitrified by adding water containing ammonium ($NH_4^+$) to the water after step ii.) and allowing bacteria to convert the nitrite ($NO_2^-$) to dinitrogen gas ($N_2$) using ammonium ($NH_4^+$) as the electron donor.

10. The process according to claim 1, wherein the mainstream in which $NH_4^+$ has been converted to $NO_2^-$ is transferred to an anammox vessel in which nitrite ($NO_2^-$) formed in the nitritation vessel is allowed to react with residual ammonium ($NH_4^+$) to form dinitrogen gas ($N_2$).

11. The process according to claim 1, wherein anoxic conditions refers to a concentration of dissolved oxygen of 0.5 milligrams per liter or less.

12. The process according to claim 1, wherein the bacteria in the nitrification vessels are grown on free-flowing carrier elements.

13. The process according to claim 12, wherein the free-flowing carrier elements comprise protected surfaces for growth of a bacterial film thereon such that a thickness of a film in which the bacteria grow is limited to 500 μm, 300 μm or 200 μm.

* * * * *